United States Patent
Nath et al.

(10) Patent No.: US 10,093,315 B2
(45) Date of Patent: Oct. 9, 2018

(54) TARGET VEHICLE DESELECTION

(71) Applicant: Ford Global Technologies, LLC, Dearborn, MI (US)

(72) Inventors: Nitendra Nath, Troy, MI (US); Brian Tamm, Pleasant Ridge, MI (US); Aaron L. Mills, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 4 days.

(21) Appl. No.: 15/269,446

(22) Filed: Sep. 19, 2016

(65) Prior Publication Data

US 2018/0079409 A1 Mar. 22, 2018

(51) Int. Cl.
*G05D 1/00* (2006.01)
*B60W 30/12* (2006.01)
*H04L 29/08* (2006.01)

(52) U.S. Cl.
CPC ........... *B60W 30/12* (2013.01); *G05D 1/0088* (2013.01); *H04L 67/12* (2013.01); *B60W 2750/306* (2013.01)

(58) Field of Classification Search
CPC ........ B60W 30/16; B60W 30/12; G05D 3/12; G05D 3/20; G05D 1/02
USPC .................... 382/103; 342/66, 70–71; 701/27
See application file for complete search history.

(56) References Cited

U.S. PATENT DOCUMENTS

| | | |
|---|---|---|
| 5,493,302 A | 2/1996 | Woll et al. |
| 5,612,699 A | 3/1997 | Yamada |
| 5,761,629 A | 6/1998 | Giling |
| 7,386,385 B2 | 6/2008 | Heinrichs-Bartscher |
| 9,165,468 B2* | 10/2015 | Luo ........................ B60W 30/12 |
| 9,412,277 B2 | 8/2016 | Nath et al. |
| 9,760,090 B2* | 9/2017 | Shashua ................ G05D 1/0088 |
| 9,799,218 B1* | 10/2017 | Gordon ..................... G08G 1/09 |
| 9,817,399 B2* | 11/2017 | Braunstein ........... G05D 1/0088 |
| 9,834,216 B2* | 12/2017 | Pawlicki ............... B60W 30/18 |
| 9,868,443 B2* | 1/2018 | Zeng ............... B60W 30/18163 |

(Continued)

FOREIGN PATENT DOCUMENTS

| | | |
|---|---|---|
| JP | H1139600 A | 6/1989 |
| JP | 2000057500 A | 2/2000 |

(Continued)

OTHER PUBLICATIONS

Study on the NS Model and Improved NS Model of Mixed Traffic Flow with Periodic Boundary Condition; Guo Jian; Yang Yong; Zhang Lixun; 2010 International Conference on Intelligent Computation Technology and Automation; Year: 2010, vol. 3 pp. 609-613, DOI: 10.1109/ICICTA.2010.612.*

Front and rear vehicle detection and tracking in the day and night times using vision and sonar sensor fusion; SamYong Kim; Se-Young Oh; JeongKwan Kang; YoungWoo Ryu; Kwangsoo Kim; Sang-Cheol Park; KyongHa Park; 2005 IEEE/RSJ International Conference on Intelligent Robots and Systems; Year: 2005; pp. 2173-2178, DOI: 10.1109/IROS.2005.1545321.*

(Continued)

*Primary Examiner* — Cuong H Nguyen
(74) *Attorney, Agent, or Firm* — Frank A. MacKenzie; Bejin Bieneman PLC

(57) ABSTRACT

To deselect a target vehicle, certain actions are taken by an autonomously operating vehicle. An identified lane is identified. A target vehicle in the identified lane is selected. The target vehicle is determined to be departing the identified lane when an edge of the target vehicle crosses a virtual boundary. The target vehicle is deselected after determining that the target vehicle is departing the identified lane.

20 Claims, 8 Drawing Sheets

(56) References Cited

U.S. PATENT DOCUMENTS

| | | | |
|---|---|---|---|
| 2005/0192736 A1* | 9/2005 | Sawada | G09B 9/05 |
| | | | 701/117 |
| 2010/0246889 A1* | 9/2010 | Nara | G06K 9/00798 |
| | | | 382/104 |
| 2011/0251768 A1* | 10/2011 | Luo | B60W 30/12 |
| | | | 701/70 |
| 2012/0209492 A1 | 8/2012 | Choi | |
| 2013/0226402 A1 | 8/2013 | Tsuruta et al. | |
| 2014/0200801 A1* | 7/2014 | Tsuruta | B60W 30/00 |
| | | | 701/400 |
| 2015/0217768 A1* | 8/2015 | Fairgrieve | B60W 30/143 |
| | | | 701/93 |
| 2016/0200321 A1 | 7/2016 | Yamada et al. | |
| 2016/0209219 A1* | 7/2016 | Grush | G07B 15/063 |
| 2016/0313133 A1* | 10/2016 | Zeng | B60W 30/18163 |
| 2017/0008521 A1* | 1/2017 | Braunstein | G01C 21/32 |
| 2017/0129489 A1* | 5/2017 | Pawlicki | B60W 30/18 |

FOREIGN PATENT DOCUMENTS

| | | |
|---|---|---|
| JP | 2002067732 A | 3/2002 |
| KR | 20130022151 A | 3/2013 |
| WO | 2016117467 A1 | 7/2016 |

OTHER PUBLICATIONS

Prediction of unintended lane departure based on virtual driver; Qingyang Chen et al.; 2011 14th International IEEE Conference on Intelligent Transportation Systems (ITSC); year 2011; pp. 1727-1734.*

Implementation of dynamic boundary on multiple Kalman trackings using radar; Min-Shiu Hsieh; Siang-You Luo; Po-Hsiang Liao; De-Qiang Ye; 2017 IEEE 20th International Conference on Intelligent Transportation Systems (ITSC); pp. 1-6; IEEE Conferences; Year: 2017.*

Lane Boundary Detection and Tracking using NNF and HMM Approaches; M. Boumediene; A. Ouamri; N. Dahnoun 2007 IEEE Intelligent Vehicles Symposium; Year: 2007; pp. 1107-1111; IEEE Conferences.*

Lane finding using homogeneous groups of cooperating autonomous vehicles; S. A. Redfield; 2004 IEEE/OES Autonomous Underwater Vehicles (IEEE Cat. No. 04CH37578); Year: 2004; pp. 26-31; IEEE Conferences.*

Search Report from United Kingdom Intellectual Property Office dated Jan. 30, 2018 regarding GB Application No. 1714935.2 (4 pages).

* cited by examiner

TARGET VEHICLE DESELECTION

BACKGROUND

Autonomous vehicles that track a leading vehicle selected as a target vehicle to control vehicle separation may be confused by the target vehicle changing lanes as when the target vehicle exits a limited access highway. If the autonomous vehicle maintains the exiting vehicle as a target, it may inappropriately slow down even though it remains in a traffic lane.

DETAILED DESCRIPTION

Introduction

To deselect a target vehicle to control vehicle separation, certain actions are taken by an autonomously operating vehicle. An identified lane is identified. A target vehicle in the identified lane is selected. The target vehicle is determined to be departing the identified lane when an edge of the target vehicle crosses a virtual boundary. The target vehicle is deselected after determining that the target vehicle is departing the identified lane.

Relative orientations and directions (by way of example, upper, lower, bottom, rearward, front, rear, back, outboard, inboard, inward, outward, lateral, let, right) are set forth in this description not as limitations, but for the convenience of the reader in picturing at least one embodiment of the structures described. Such example orientations are from the perspective of an occupant seated in a driver seat, facing a dashboard. In the Figures, like numerals indicate like parts throughout the several views.

Exemplary System Elements

Figure 1:
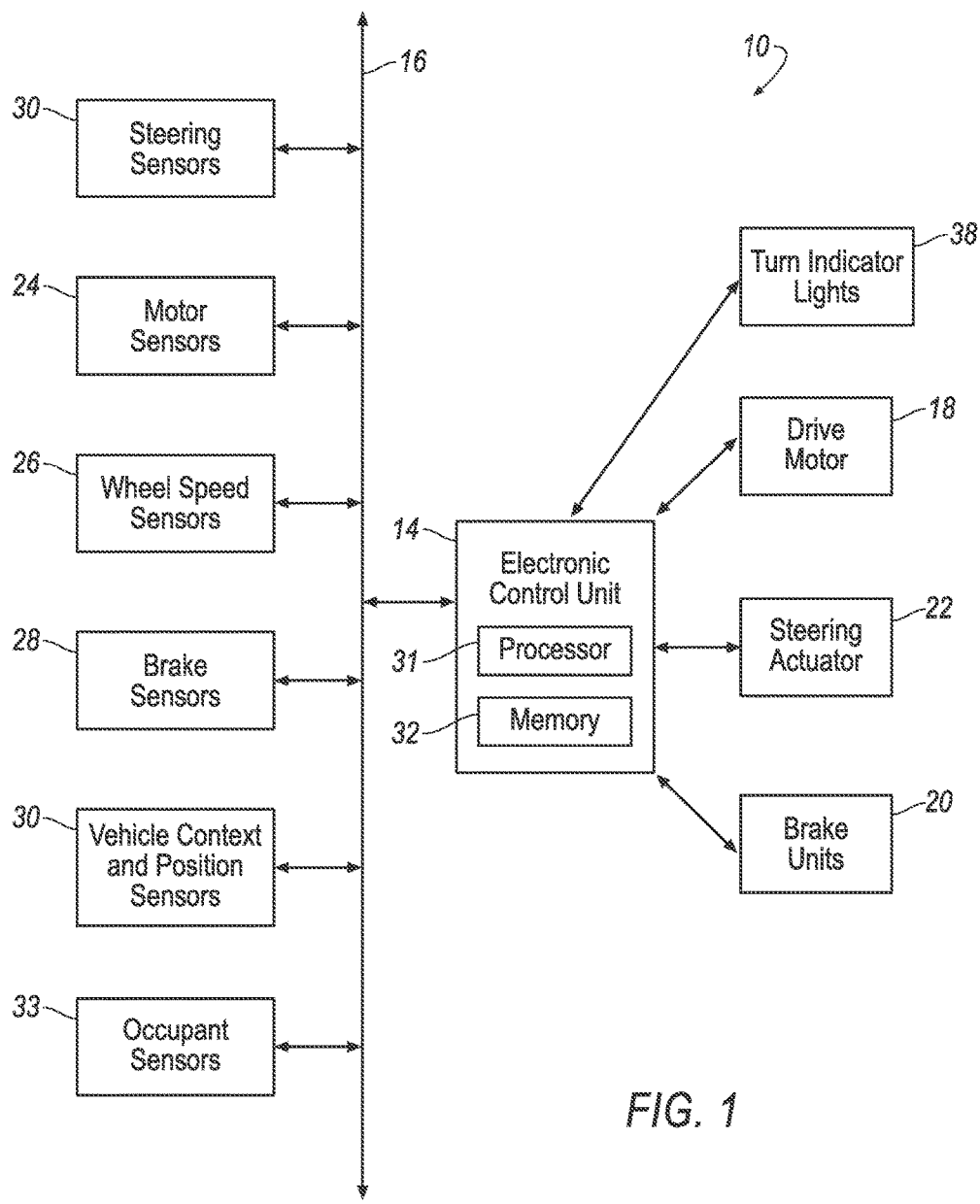
FIG. 1 schematically illustrates an example system.
Figure 2:
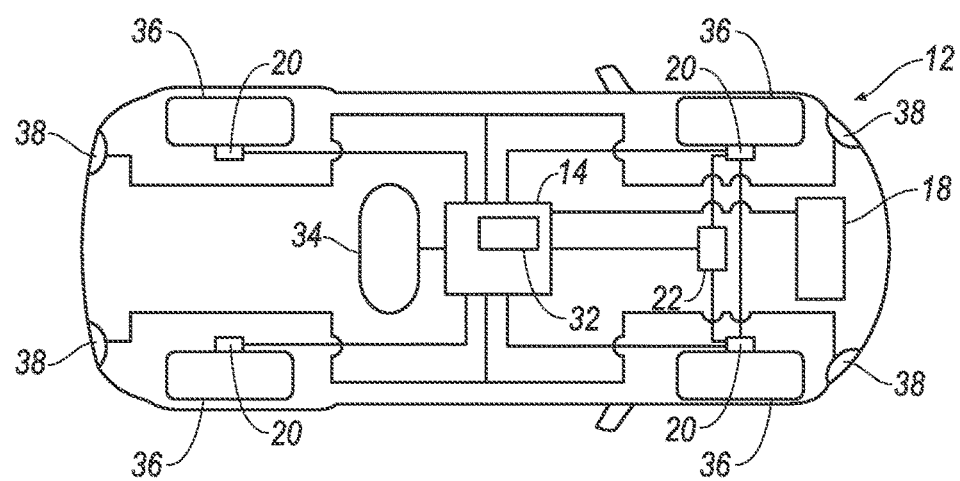
FIG. 2 schematically illustrates an example vehicle incorporating the system of FIG. 1.
Figure 3:
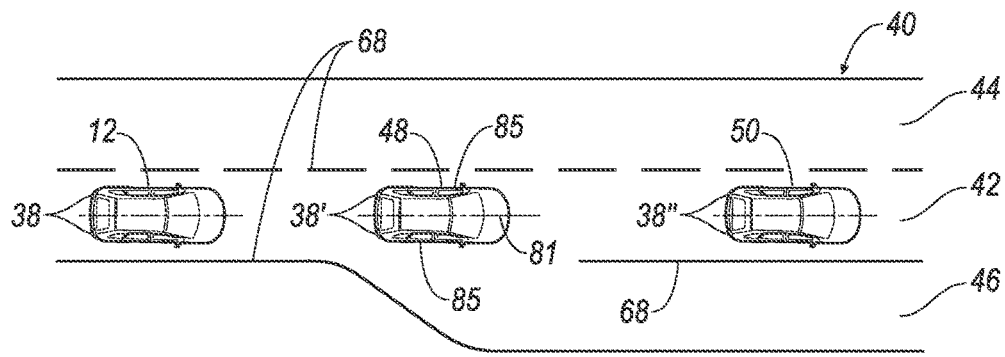
FIG. 3 illustrates an exemplary roadway with three vehicles in a first orientation.
Figure 4:
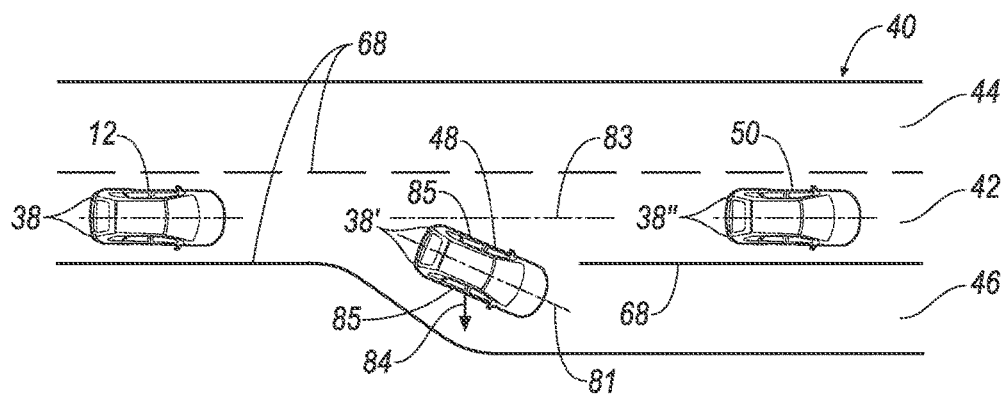
FIG. 4 illustrates the roadway of FIG. 3 with the vehicles in a second orientation.
Figure 5:
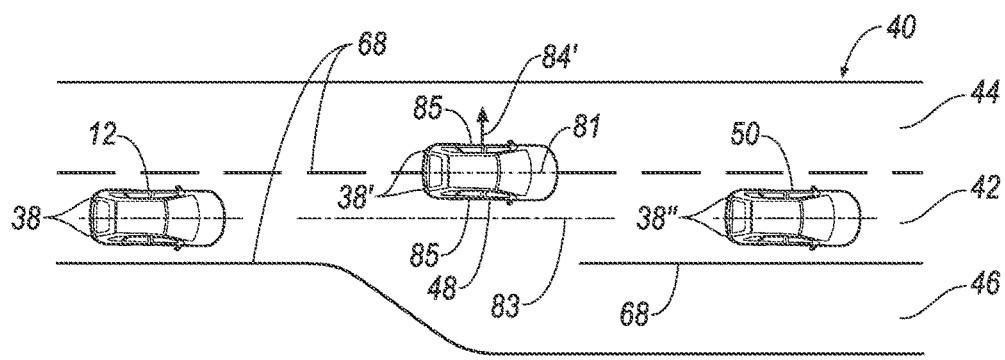
FIG. 5 illustrates the roadway of FIG. 3 with the vehicles in a third orientation.
Figure 6:
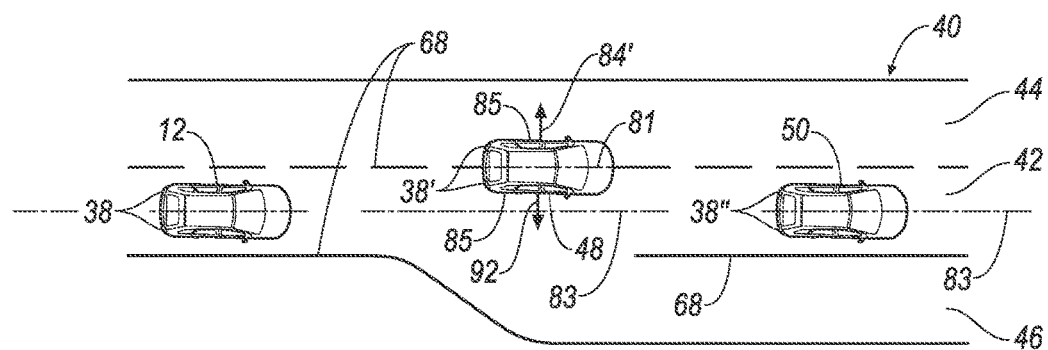
FIG. 6 illustrates the roadway of FIG. 3 with the vehicles in a fourth orientation.

FIG. 1 schematically illustrates an example system 10 for autonomously maneuvering an autonomous host vehicle 12. Host vehicle 12 is schematically illustrated in FIG. 2. System 10 may include a plurality of sensors and a plurality of actuators, connected to a computing device e.g., in the form of an electronic control unit or ECU 14. System 10 may include a vehicle network such as an example system controller area network ("CAN") bus 16 which provides a transmission media between and connecting elements of system 10 including ECU 14 and components and ancillary systems including, by way of example, a drive motor 18, a plurality of brake units 20, a steering actuator 22, motor sensors 24, wheel speed sensors 26, brake sensors 28, steering sensors 30, and turn indicator lights 38. The referenced sensors may also include yaw sensors (not shown) to detect and measure vehicle yaw. Turn indicator lights 38, as is known, are located in the front and rear of vehicles, proximate to the vehicle corners, generally consistent with government standards. Turn indicator lights 38 are activated and illuminated on one of a right side of vehicle 12 and a left side of vehicle 12 responsive to activation by a vehicle operator, preferably before initiation of a turn or a lane change. Each of drive motor 18, brake units 20, and steering actuator 22 are illustrated as being connected directly to ECU 14, and may alternatively be connected to ECU 14 through bus 16. Turn indicator lights 38 are also illustrated as connected to ECU, but are not, for the presently disclosed embodiment, required to be so connected. Each of drive motor 18, brake units 20, and steering actuator 22 may include a respective electronic controller that receives instructions from ECU 14.

ECU 14 includes an electronic processor 31 and an associated memory 32. The memory 32 of ECU 14 includes one or more forms of computer-readable media, and stores instructions executable by the processor 31 for performing various operations, including such operations as disclosed herein. ECU 14 includes programming to autonomously operate autonomous vehicle 12 in both a fully autonomous mode and a semi-autonomous mode as is known. For purposes of this disclosure, the term "autonomous vehicle" is used to refer to both a vehicle operating in a fully autonomous mode and a vehicle operating in a semi-autonomous mode. A fully autonomous mode is defined as one in which each of vehicle 12 propulsion via a powertrain including a motor 18 as defined below, braking, and steering are controlled by the ECU 14 under substantially all circumstances. A semi-autonomous mode is defined as one in which any two of vehicle 12 propulsion, braking, and steering are controlled by ECU 14, such as, by way of example, adaptive cruise control ("ACC") in which propulsion and braking, but not steering, are controlled by ECU 14.

The memory 32 of ECU 14 also stores data. Data may include collected data that is collected from a variety of devices. In general, collected data may include any data from an appropriate map database, and any data that may be gathered by any data collection device including motor sensors 24, wheel speed sensors 26, steering sensors 30, occupant sensors 33, situational awareness sensors 34, and/or data computed from such data. Exemplary steering sensors may include a rack position sensor and/or a lateral acceleration sensor. Exemplary situational awareness sensors 34 may include vehicle context and position sensors and location sensors such as a radar sensor, a lidar sensor, a vision sensor, a global positioning system ("GPS") sensor and the like. The foregoing examples are not intended to be limiting. Other types of data collection devices may be used to provide data to ECU 14. Data may also include calculated data calculated in ECU 14 from collected data and from other calculated data.

Vehicle 12 is schematically illustrated in FIG. 2. Vehicle 12 includes four wheels 36, each of which may include a tire (not shown). Each of wheels 36 may be associated with one of the brake units 20. Wheel speed sensors 26 may be integrated into brake units 20. Steering actuator 22 and associated steering sensors are incorporated into the vehicle 12 steering system. Motor 18 may, by way of example, be an internal combustion engine or an electric motor or a combination thereof. Although motor 18 is illustrated as a single unit near a front of vehicle 12, motor 18 may alternatively be located elsewhere in the vehicle 12. Motor 18 may yet alternatively be provided in the form of a plurality of electric motors associated with a plurality of wheels 36. An all-wheel drive vehicle may have a motor 18 associated with each wheel 36. Turn indicator lights 38 are located near each corner of vehicle 12.

The memory of ECU 14 stores data received via various communications mechanisms. ECU 14 may be configured for communications on a vehicle network such as an Ethernet network or the CAN bus 16 or the like, and/or for using other wired or wireless protocols, e.g., Bluetooth®, Bluetooth® Low Energy, or WiFi. ECU 14 may also have a connection to an onboard diagnostics connector such as an OBD-II connector. Via the CAN bus, OBD-II, Ethernet, and/or other wired or wireless mechanisms, ECU 14 may transmit messages to various devices in a vehicle and/or receive messages from the various devices, e.g., controllers, actuators, sensors, switches, etc. as discussed herein. Although ECU 14 is shown as a single ECU in FIG. 1 and FIG. 2 for ease of illustration, it is to be understood that ECU 14 could in fact include, and various operations described herein could be carried out by, one or more computing devices, e.g., vehicle component controllers such as are known and/or a computing device dedicated to the discrete brake units 20, steering actuator 22 and motor 18.

FIGS. 3-6 illustrate vehicle 12 on a roadway 40. Roadway 40 has a plurality of lanes. Roadway 40 may be a limited access highway. Vehicle 12 is illustrated as being in and remains in, for purposes of this discussion, an identified or host lane 42. Exemplary illustrated host lane 42 is shown as a slow lane or right-most lane of roadway 40. A first illustrated adjacent lane 44 or left lane 44 is to a left of host lane 42. A second illustrated adjacent lane 46 or right lane 46 is to a right of host lane 42. Adjacent lanes 44, 46 may include, by way of example and not limitation, exit lanes, entrance lanes, overtaking lanes, and slow lanes. As illustrated, exemplary left lane 44 is shown as an overtaking lane 44 and exemplary right lane 46 may be an exit lane 46.

When operating in an autonomous mode, the program in ECU 14 commands vehicle 12 to avoid forward impacts, including impacts with another vehicle. To avoid such forward impacts, the program may cause ECU 14 to select a target vehicle 48 in the host lane 42 from which a separation of a selected distance is to be maintained. Such distance may increase with vehicle speed. Both the currently selected target vehicle ("in-path target vehicle") 48 and an alternative or secondary target vehicle 50 may be present in the host lane 42, or perceived as transitioning into host lane 42. The selection may be by a known process, not described herein. Target vehicle 48 has turn indicator lights 38' much like the turn indicator lights 38 of vehicle 12. Similarly, secondary target vehicle 50 has turn indicator lights 38'' much like the turn indicator lights 38 of vehicle 12.

Figure 7:
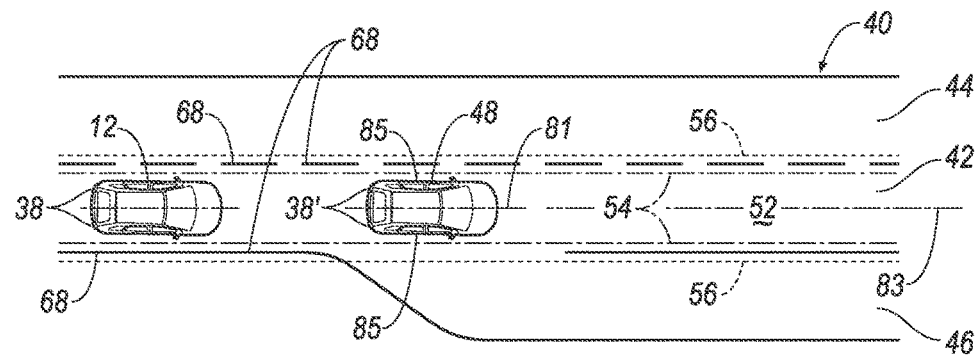
FIG. 7 illustrates the roadway of FIG. 3 showing virtual lane boundaries.
Figure 8:
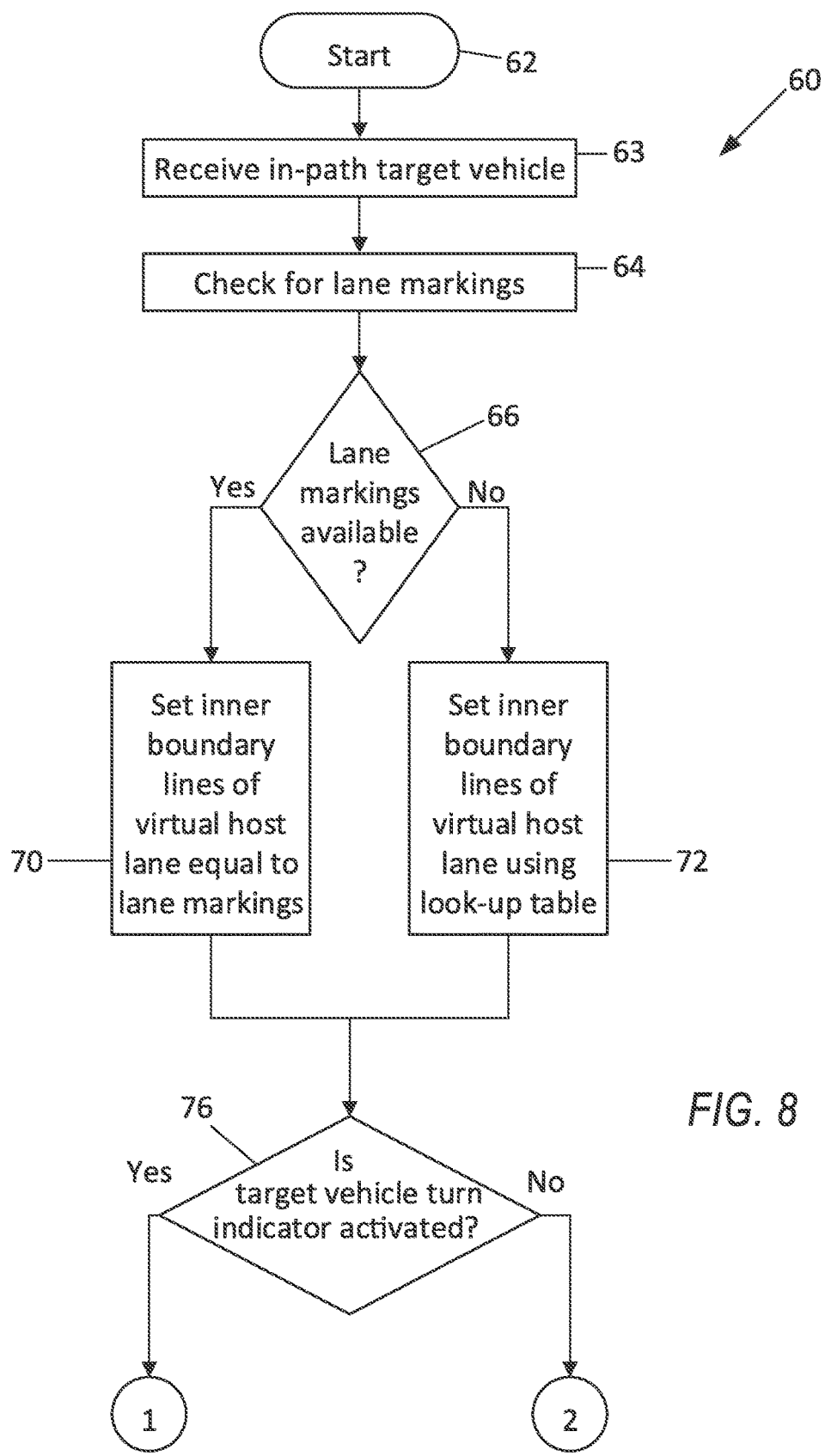
FIG. 8 illustrates a first part of a flow chart of an example logic for target deselection.
Figure 9:
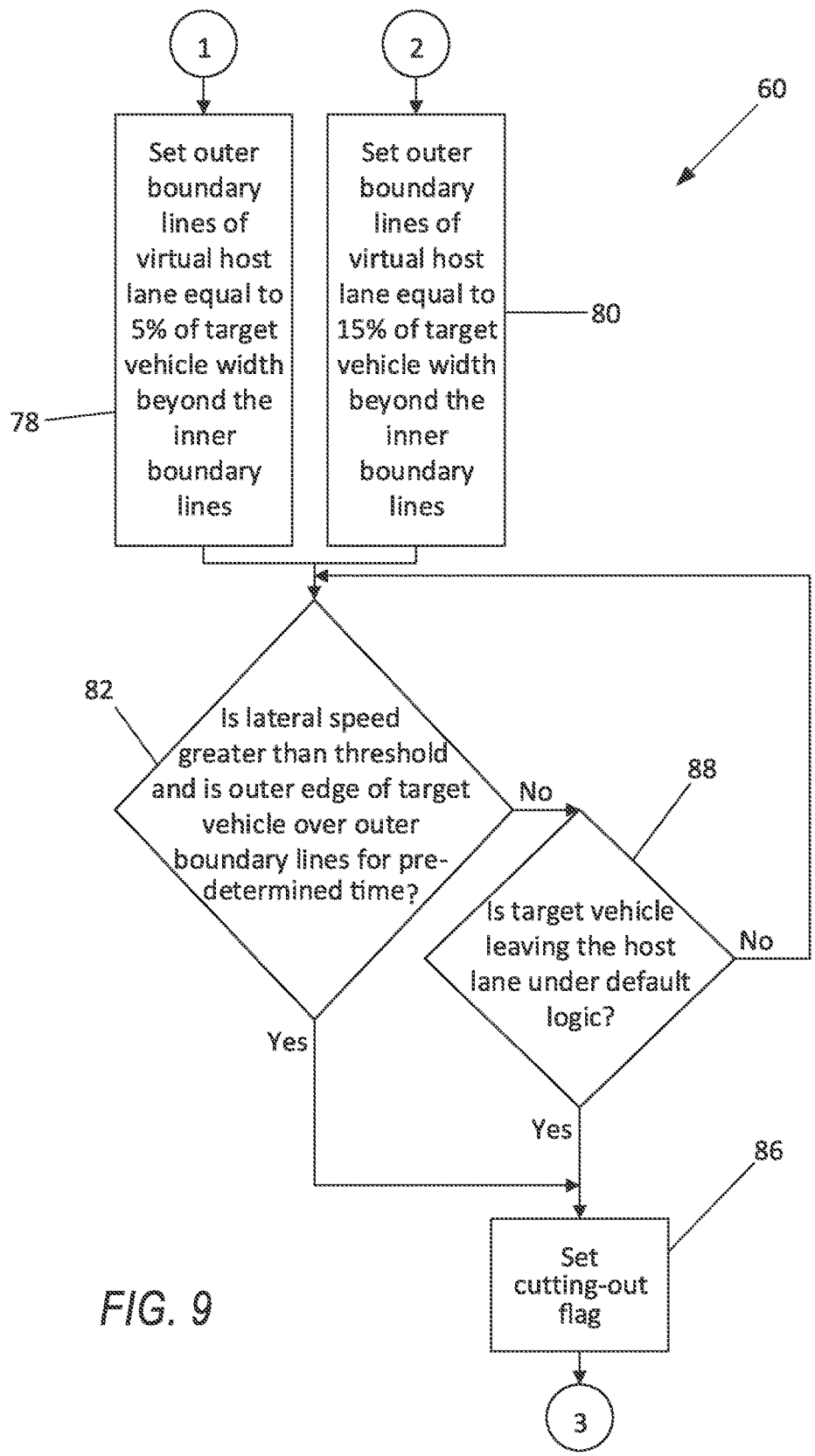
FIG. 9 illustrates a second part of the flow chart of FIG. 8.

FIG. 7 illustrates a virtual model or representation 52 of host lane 42, alternatively referred to as a virtual host lane 52, employed by a below-described process. Virtual host lane 52 includes a pair of virtual inner boundary lines 54 and a pair of virtual outer boundary lines 56. Inner boundary lines 54 of lane 52 may be separated by the same measurement or dimension as a width of host lane 42 that is determined as described below in the Processing section of this disclosure. Outer boundary lines 56 are outside of the inner boundary lines 54 and are separated as described in the Processing section. Virtual lane 52 extends for a limited predetermined range.

Processing

FIGS. 8-11 illustrate a target vehicle deselection process 60 allowing more rapid deselection of target vehicles by an autonomous vehicle 12. ECU 14 executes the steps illustrated in FIGS. 8-11 as described below. A computer program for executing process 60 is instantiated in start block 62, e.g., when vehicle 12 begins driving on a roadway.

Next, process block 63 receives data from a separate known process for selecting the vehicle 48 in a path of host vehicle 12 as the in-path target vehicle 48. Process 60 moves to process block 64 which receives situational awareness sensor 34 (e.g., camera) data to determine lane marking availability.

Process 60 then moves to decision block 66 to determine whether, based on the data collected in block 64, lane markings 68, such as lane stripings and lane reflectors for host lane 42, can be detected by or are available to sensors 34. Lane markings 68 are evaluated at locations proximate to host vehicle 12, and beyond a target vehicle 48, and in an intervening range. Lane markings 68 may be on both a left and a right side of host lane 42 and may be solid lines and broken or dashed lines. Lane markings 68 on both sides of host lane 42 need to be sufficiently distinct to enable detection and tracking with high confidence. Such a level of distinctness may be consistent with the markings 68 being visually distinct to a human.

When decision block 66 determines that lane markings 68 are sufficiently distinct, process 60 moves to process block 70 which conforms or sets the inner boundary lines 54 of virtual host lane 52 equal to lane markings 68.

When decision block 66 determines that lane markings 68 are not sufficiently distinct, process 60 may move to process block 72 which sets the inner boundary lines 54 of virtual host lane 52 equal to values provided by referencing a look-up table. Such look-up table values may include a predetermined default value for a lane width, one exemplary default value equaling four meters. The measurement of the distance between inner boundary lines 54, when determined by the look-up table, may be dependent on a distance from host vehicle 12 and may decrease in width with distance from the host vehicle.

After inner boundary lines 54 have been established in accord with one of process block 70 and 72, process 60 moves to decision block 76.

Decision block 76 determines if turn indicator light 38' of the target vehicle 48 is activated. If yes, then moving to FIG. 9, process block 78 establishes the outer boundary lines 56 of lane 52 as located at a position beyond or outside of each of the inner boundary lines 54 by an exemplary amount of 5% of a width of the target vehicle 48. If turn indicator light 38' is not activated, then process block 80 establishes the virtual outer boundary lines 56 of lane 52 as located at a position beyond or outside of each of the inner boundary lines 54 by an exemplary amount of 15% of the target vehicle width.

Once outer boundary lines 56 have been established, they can be used by ECU 14 as lateral movement thresholds for target vehicles 48 and 50. Lateral movement is movement of a vehicle in a direction substantially orthogonal to lines 54 and 56. Lateral movement may also be defined as a movement of a vehicle centerline 81 toward or away from a centerline 83 of lane 42. Centerline 81 may be in the form of a longitudinal axis that bisects a vehicle, such as target vehicle 48. Centerline 83 may be midway between lines 54, and midway between lines 56 and midway between markings 68. Process 60 moves to decision block 82 to determine whether a lateral movement speed of vehicle 48 in an outboard direction, represented by arrow 84 in FIG. 4 for rightward movement, and represented by arrow 84' in FIG. 5 for leftward movement, is greater in magnitude than a threshold lateral speed. The lateral movement speed may be established as a relative lateral speed, such that lateral speeds in a first direction have a positive value and lateral speeds in an opposite second direction have a negative value. In such cases, there may be separate threshold values of lateral speed for the opposed directions, with one being positive and the other being negative.

Decision block 82 also determines when an outer edge 85 of the target vehicle 48, or a target edge 85, is outboard of outer boundary line 56 on a side coincident with the direction of lateral speed for a predetermined period of time. Such a period of time may be established by obtaining a predetermined number, an exemplary number being three, of consecutive scans of the outer edge 85 of vehicle 48 being over the outer boundary line 56. To establish the existence of the outer edge 85 being over outer boundary line, system 10 and process 60 may establish an offset value indicative of the relative position of vehicle 48 to the boundaries of host lane 42. The offset value may equal a distance between centerline 81 or midpoint of a width of vehicle 48, and the outer boundary line 56. An offset value less than half the width of vehicle 48 indicates overlap of vehicle 48 over boundary line 56 on that side.

When both conditions are satisfied, i.e., when the outer edge 85 is over the outer boundary line 56 by at least a certain percent of the vehicle width for a predetermined period of time, and the lateral velocity 92' is in a direction of the centerline 81 of vehicle 48 moving away from the centerline 83 of lane 42, process block 86 sets a cutting-out flag or switch indicative of vehicle 48 cutting-out of or departing lane 42. The cutting-out flag may be labeled, by way of example, "L2Rsetcutflag" for a perceived shift to rightward lane 46 consistent with FIG. 4 and "R2Lsetcutflag" for a perceived shift to leftward lane 44 consistent with FIG. 5.

When one or both of the conditions are not satisfied, process 60 may move to decision block 88 which determines whether the target vehicle is leaving host lane 42 using a default rule. An exemplary default rule may make a determination of a lane change only after it is determined that half the width of target vehicle 48 is in another lane. When such default rule determines that the conditions of a lane change are present, process 60 may move to process block 86 to set the flag as indicated above. If decision block 88 determines that the default conditions of a lane change are not present, process 60 may cycle back to decision block 82 to continue checking for an anticipated lane change. Yet alternatively, in place of decision block 88, process 60 may be terminated.

Figure 10:
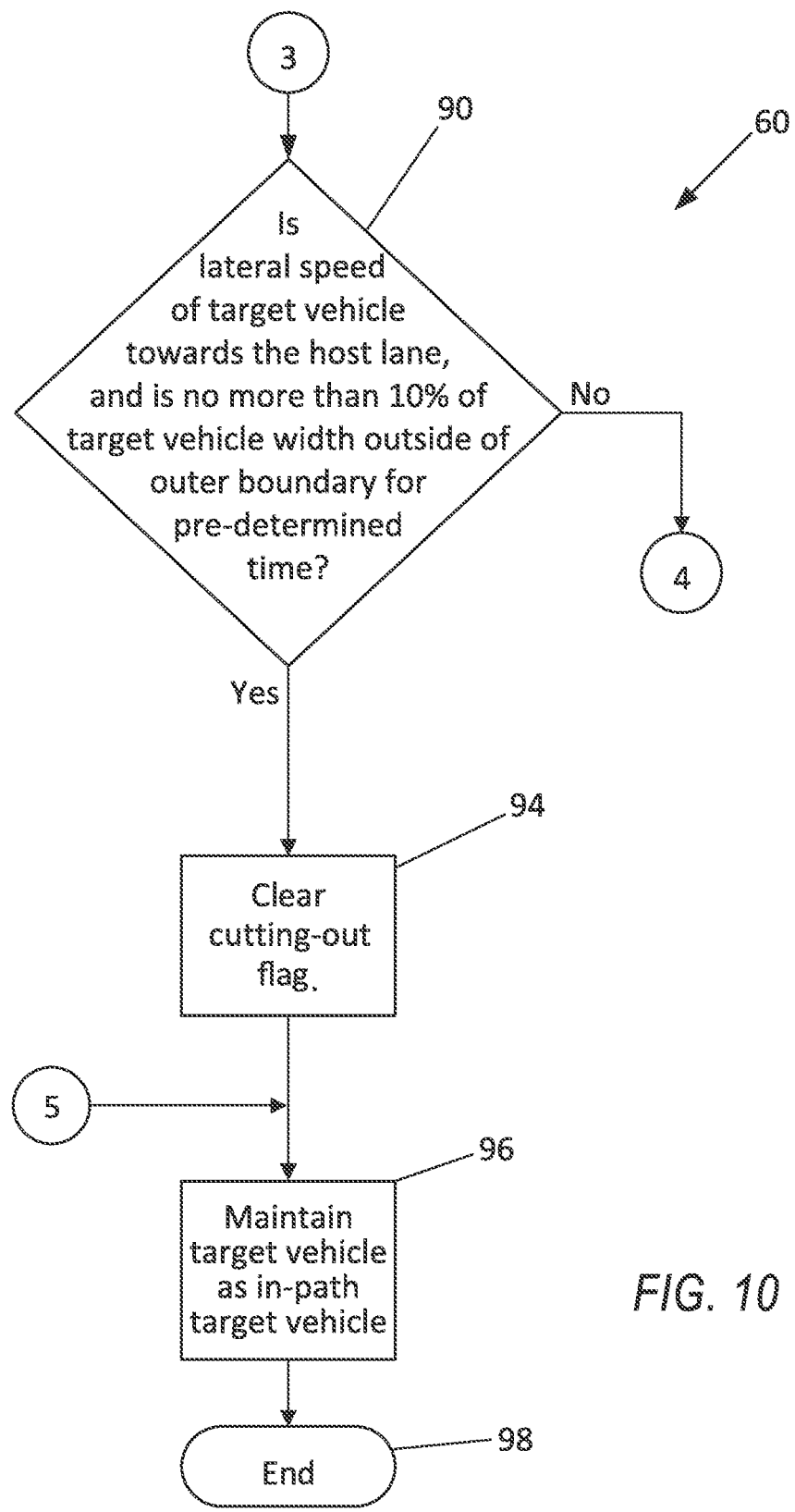
FIG. 10 illustrates a third part of the flow chart of FIG. 8.

After the cutting-out flag has been established by process block 86, process 60 moves to decision block 90 in FIG. 10. Decision block 90 checks to see if target vehicle 48 is returning to host lane 42 and virtual lane 52 based on two values: the direction of the lateral velocity of target vehicle 48, and the position of vehicle 48 in host lane 42. In an example illustrated in part by FIG. 6, vehicle 48 is moving back towards lane 42 from lane 44 as indicated by arrow 92. Arrow 92 is representative of a measured lateral speed in the direction of lane 42. When no more than 10% of a width of vehicle 48 is outside of the outer boundary line 56 on the side coincident or target edge 85 with the direction of lateral speed, presently the side closest to lane 44, for a predetermined period of time. Such a period of time may be established by obtaining a predetermined number, an exemplary number being three, of consecutive scans of the outer edge 85 of vehicle 48 being over the outer boundary line 56.

When both conditions considered by decision block 90 are satisfied, i.e., no more than 10% of the vehicle width is outside of the outer boundary line 56, and the measured lateral speed of vehicle 48 is in an inboard direction, moving the vehicle centerline 81 toward the lane centerline 83, process 60 moves to process block 94 which clears the cutting-out flag. When the cutting-out flag is cleared, process 60 moves to process block 96 which maintains vehicle 48 as the in-path target vehicle. After process block 96, process 60 is terminated with an end block 98.

Figure 11:
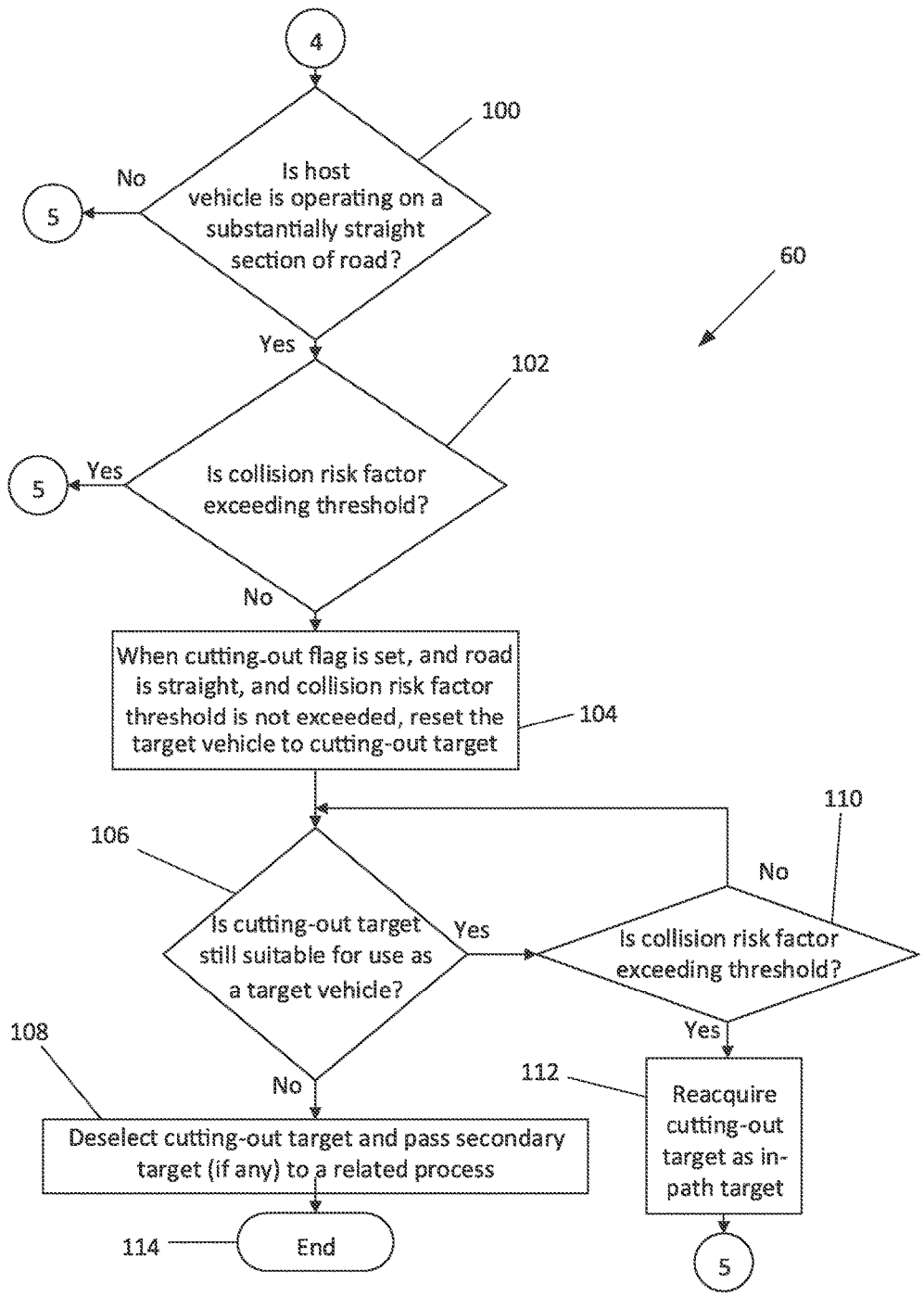
FIG. 11 illustrates a fourth part of the flow chart of FIG. 8.

When one of the conditions considered by decision block 90 is not satisfied, process 60 moves to decision block 100 of FIG. 11. Decision block 100, using data available from sensors 34 and map data when available, determines whether vehicle 12 is operating on a substantially straight section of road. When vehicle 12 is not operating on a substantially straight section of road, process 60 loops back to process block 96 of FIG. 10 and vehicle 48 is maintained as the target vehicle. When vehicle 12 is operating on a substantially straight section of road, process 60 moves to decision block 102.

Decision block 102 calculates a collision risk factor for a collision between vehicle 12 and vehicle 48 if vehicle 12 were deselected as the target vehicle, and determines whether the collision risk factor exceeds a predetermined collision risk factor threshold. When the threshold is exceeded, a collision flag is set, and process 60 loops back to process block 96 of FIG. 10 and vehicle 48 is maintained as the target vehicle. When the threshold is not exceeded, the collision flag is not set, and the process moves on to process block 104.

To reach process block 104, it has been determined that certain necessary conditions have been satisfied. Such necessary conditions include the cutting-out flag is set, the road is straight, and the collision risk flag has not been set, or equivalents of such conditions.

Process block resets target vehicle 48 to a cutting-out target vehicle 48. With target vehicle 48 set as the cutting-out target vehicle, process 60 allows vehicle 12 to reduce a deceleration rate of vehicle 12 to a value lower than a deceleration rate of vehicle 48, in turn reducing the relative distance between vehicle 12 and vehicle 48. The reduction in deceleration yields a smoother, less jarring ride for passengers in vehicle 12 than when vehicle 48 remains tracked as the in-path target vehicle, forcing vehicle 12 to mirror any deceleration of vehicle 48. As described below, process 60 continues to check the lane positioning of vehicle 48 to ensure the risk of collision does not exceed the threshold.

Process 60 moves to decision block 106 which determines whether cutting-out target vehicle 48 is still suitable for continued use as a target vehicle. One example basis for determining that vehicle 48 is no longer suitable for continued use as a target vehicle is that vehicle 48 is completely outside of outer boundary line 56 and is thus outside of host lane 42 and virtual host lane 52. So long as vehicle 48 remains outside of the host lane, the risk of collision will remain below the threshold, allowing deselection of vehicle 48.

When cutting-out target vehicle 48 is determined to be no longer suitable for use as a target vehicle, vehicle 48 is deselected by process block 108. After or coincident with deselection of vehicle 48, process block 108 may select another vehicle in lane 42 such as secondary target vehicle 50 as in in-path target vehicle, or may operate without a target vehicle if no appropriate vehicle is sensed. Such new target or lack of target is passed on to a separate process. Process 60 then moves to end block 114 and terminates.

When cutting-out target vehicle 48 is determined to remain suitable for use as a target vehicle, as may occur if vehicle 48 is not completely out of the host lane 42, process 60 moves to decision block 110. Decision block 110 assesses whether the collision risk factor exceeds the collision risk factor threshold.

When decision block 110 determines that the risk factor does not exceed the threshold, process 60 loops back to decision block 106 to determine whether the cutting-out target is still suitable for use as a target vehicle. When decision block 110 determines that the risk factor does exceed the threshold, process 60 moves to process block 112.

Process block 112 reacquires cutting-out target vehicle 48 as the in-path target vehicle. Process 60 then loops back to process block 96.

Conclusion

An example system and method for deselecting a target vehicle have been disclosed.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

With regard to the references to ECUs in the present description, computing devices such as those discussed herein generally each include instructions executable by one or more computing devices such as those identified above, and for carrying out blocks or steps of processes described above. For example, process blocks discussed above are embodied as computer executable instructions.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
    a computing device that includes processor and a memory; and
    a sensor connected to the computing device;
    the memory of the computing device storing instructions executable by the processor to:
        identify an identified lane based on data from the sensor;
        select, from a host vehicle that includes the computing device and the sensor, a target vehicle in the identified lane;
        establish a model of the identified lane in the form of a virtual lane with the virtual lane having a virtual outer boundary line;
        determine that the target vehicle is departing the identified lane when a vehicle target edge based on data from the sensor crosses the virtual outer boundary line; and
        deselect the target vehicle after determining that the target vehicle is departing the identified lane.

2. A system as claimed in claim 1, wherein the instructions further comprise an instruction to set a cutting-out flag when the target edge crosses the virtual outer boundary line and the target vehicle is moving in an outboard direction relative to the identified lane as a necessary condition to deselect the target vehicle.

3. A system as claimed in claim 2, wherein the instructions further comprise requiring the target vehicle be moving in the outboard direction at a lateral speed exceeding a threshold value as a condition of setting the cutting-out flag.

4. A system as claimed in claim 2, wherein the instructions further comprise an instruction to clear the cutting-out flag when the target edge is no more than ten percent of a width of the target vehicle outside the virtual outer boundary line.

5. A system as claimed in claim 4, wherein when the instructions further include instructions to deselect the target vehicle when the cutting-out flag is set, the identified lane is straight, and a collision risk factor threshold is not exceeded.

6. A system as claimed in claim 4, wherein the instructions further comprise establishing that the target vehicle is moving in an inboard direction relative to the identified lane as a condition of clearing the cutting-out flag.

7. A system as claimed in claim 6, wherein the instructions further comprise establishing that the edge is no more than ten percent of the width of the target vehicle outside of the virtual outer boundary line for a predetermined period of time as a condition of clearing the cutting-out flag.

8. A system as claimed in claim 1, wherein the virtual lane is generated for a predetermined range.

9. A system as claimed in claim 8, wherein a virtual inner boundary line of the virtual lane is conformed to lane markings when the lane markings are available and the virtual inner boundary line of the virtual lane is conformed to values from a look-up table when the lane markings are not available.

10. A system as claimed in claim 9, wherein the virtual outer boundary line of the virtual lane is positioned beyond the virtual inner boundary line by 5 to 15 percent of a width of the target vehicle.

11. A method of controlling an autonomous vehicle, the method comprising the steps of:
    in a computing device, identifying an identified lane based on data from a sensor connected to the computing device;
    selecting, from a host vehicle that includes the computing device and the sensor, a target vehicle in the identified lane;
    establishing a model of the identified lane in the form of a virtual lane with the virtual lane having a virtual outer boundary line;
    determining that the target vehicle is departing the identified lane when a vehicle target edge based on data from the sensor crosses the virtual outer boundary line; and
    deselecting the target vehicle after determining that the target vehicle is departing the identified lane.

12. A method as claimed in claim 11, further comprising the step of setting a cutting-out flag when the target edge crosses the virtual outer boundary line and the target vehicle is moving in an outboard direction relative to the identified lane as a necessary condition to deselect the target vehicle.

13. A method as claimed in claim 12, further requiring the target vehicle be moving in the outboard direction at a lateral speed exceeding a threshold value as a condition of setting the cutting-out flag.

14. A method as claimed in claim 12, further comprising the step of clearing the cutting-out flag when the target edge is no more than ten percent of a width of the target vehicle outside the virtual outer boundary line.

15. A method as claimed in claim 14, further comprising the step of deselecting the target vehicle when the cutting-out flag is set, the identified lane is straight, and a collision risk factor threshold is not exceeded.

16. A method as claimed in claim 14, further establishing that the target vehicle is moving in an inboard direction relative to the identified lane as a condition of clearing the cutting-out flag.

17. A method as claimed in claim 16, further establishing that the edge is no more than ten percent of the width of the target vehicle outside of the virtual outer boundary line for a predetermined period of time as a condition of clearing the cutting-out flag.

18. A method as claimed in claim 11, further comprising the step of generating the virtual lane for a predetermined range.

19. A method as claimed in claim 18, further comprising the step of conforming a virtual inner boundary line of the virtual lane to lane markings when the lane markings are available and conforming the virtual inner boundary line of the virtual lane to values from a look-up table when the lane markings are not available.

20. A method as claimed in claim 19, further comprising the step of establishing the virtual outer boundary line of the virtual lane at a position beyond the inner boundary line by 5 to 15 percent of a width of the target vehicle.

\* \* \* \* \*